United States Patent [19]

Lingafelter

[11] Patent Number: 4,593,774

[45] Date of Patent: Jun. 10, 1986

[54] DOWNHOLE BEARING ASSEMBLY

[75] Inventor: Jerry Lingafelter, Wichita Falls, Tex.

[73] Assignee: Geo Max Drill Corp., Hollywood, Fla.

[21] Appl. No.: 692,690

[22] Filed: Jan. 18, 1985

[51] Int. Cl.⁴ .............................................. E21B 4/02
[52] U.S. Cl. ................... 175/107; 175/320; 384/93; 384/607; 277/92
[58] Field of Search ................ 175/107, 227, 92, 228, 175/371, 320; 308/4 A, 6 A; 384/606, 607, 619, 486; 277/92, 205, 189; 418/48

[56] References Cited

U.S. PATENT DOCUMENTS

| 3,894,818 | 4/1973 | Tschirky | 418/48 |
| 4,077,634 | 3/1978 | Durham | 277/92 |
| 4,260,202 | 4/1981 | Crase et al. | 175/371 X |
| 4,320,929 | 3/1982 | Clark et al. | 384/607 |
| 4,329,127 | 5/1982 | Tschirky et al. | 175/107 X |
| 4,335,791 | 6/1982 | Evans | 175/228 |
| 4,453,604 | 6/1984 | Ioanesian et al. | 175/227 X |

Primary Examiner—Stephen J. Novosad
Assistant Examiner—David J. Bagnell
Attorney, Agent, or Firm—Willian Brinks Olds Hofer Gilson & Lione

[57] ABSTRACT

A downhole bearing assembly includes concentric inner and outer tubes, with bearings mounted therebetween. A high pressure elastomeric cup seal assembly is mounted between the inner and outer tubes, and at least one metal-to-metal seal is mounted between the inner and outer tubes on each side of the high pressure seal assembly. A pair of pressure balancing systems are provided, each acting to minimize pressure differentials across a respective one of the metal-to-metal seals. The metal-to-metal seals protect the high pressure elastomeric seal assembly and the bearings from contamination by drilling mud, and the pressure balancing systems protect the metal-to-metal seals from excessive differential pressures.

10 Claims, 7 Drawing Figures

DOWNHOLE BEARING ASSEMBLY

BACKGROUND OF THE INVENTION

The present invention relates to an improved downhole bearing assembly for use with downhole motors and the like in drilling devices, in which the bearing assembly is effectively sealed against contamination.

It has been recognized for some time that downhole drilling motors can provide significant increases in drilling rates in many rock formations. However, in the past the use of downhole motors has often been limited by the life of bearing assemblies used in connection with such motors. These bearing assemblies typically include both radial and thrust bearings, and they operate under extremely adverse conditions.

In particular, downhole bearing assemblies typically operate in an environment dominated by high pressurized, highly abrasive drilling mud. Unless downhole bearing assemblies are properly designed, such abrasive drilling mud can severely limit the life of the bearing assembly, and thereby the utility of the downhole motor.

In the past, at least three approaches have been used in attempting to provide downhole bearing assemblies having an adequate bearing life. U.S. Pat. No. 4,320,929 discloses a sealed bearing system for hydraulically operated devices which attempts to seal out drilling mud and the like in order to protect the bearing assembly from abrasive contamination.

Another approach taken by the prior art is disclosed in U.S. Pat. No. 3,112,801, which describes a bearing assembly which is designed to operate with drilling mud as a lubricant. With this approach, sealing requirements are essentially eliminated.

A third approach is disclosed in Berryman U.S. Pat. No. 3,840,080, in which a sealed bearing system is filled with lubricating oil which is maintained at a higher pressure than the pressure externally of the section in order to retain the oil or other lubricant in a clean state. In particular, the Berryman system utilizes a sliding piston which is exposed to pressurized drilling mud and transmits pressurizing forces from the drilling mud to the lubricating oil.

In spite of the high level of activity in this field, a need presently exists for an improved, sealed downhole bearing assembly which can effectively protect bearings from abrasive drilling mud and provide an adequate bearing life.

SUMMARY OF THE INVENTION

The present invention is directed to an improved, sealed downhole bearing assembly which is relatively simple and economical to manufacture, and which provides effective, extended protection for downhole bearings from contamination with drilling mud.

According to this invention, a sealed downhole bearing assembly is provided which comprises an outer tube adapted to be connected to a first portion of a drill string, and an inner tube adapted to be connected to a second portion of a drill string and disposed within the outer tube to define an enclosed annular space therebetween. At least one bearing is mounted in the annular space between the inner and outer tubes to allow relative rotation therebetween. At least one high pressure seal is mounted in the annular space to divide the annular space into first and second chambers. First and second abrasion-resistant, metal-to-metal seals are mounted between the inner and outer tubes to seal the first and second chambers, respectively. The first seal is in fluid communication with an outer region exterior of the outer tube and the second seal is in fluid communication with an inner region interior of the inner tube. These metal-to-metal seals are adapted to seal effectively even when in contact with drilling mud. First and second pressure balancing systems are provided in communication with the first and second chambers, respectively. The first pressure balancing system is also in communication with the outer region to balance pressure in the first chamber with respect to the outer region, and the second pressure balancing system is in communication with the inner region in order to balance pressure in the second chamber with respect to the inner region.

It has been discovered that a remarkably effective, economical, and long-lived sealing system can be provided by combining the excellent abrasion-resistant characteristics of a metal-to-metal seal with the high pressure characteristics of an elastomeric seal. Typically, metal-to-metal seals function effectively only when the differential pressure across the seal does not exceed a relatively low value. For this reason, it would appear that metal-to-metal seals are unsuitable for use in the downhole environment, which is typically characterized by large, quickly fluctuating pressure differentials. However, by combining a high pressure seal to isolate certain regions from large pressure differences with a metal-to-metal seal to exclude abrasive contaminants and a pressure balancing system to reduce pressure differentials across the metal-to-metal seal, the present invention operates in a reliable and effective manner to protect the downhole bearings from contamination.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
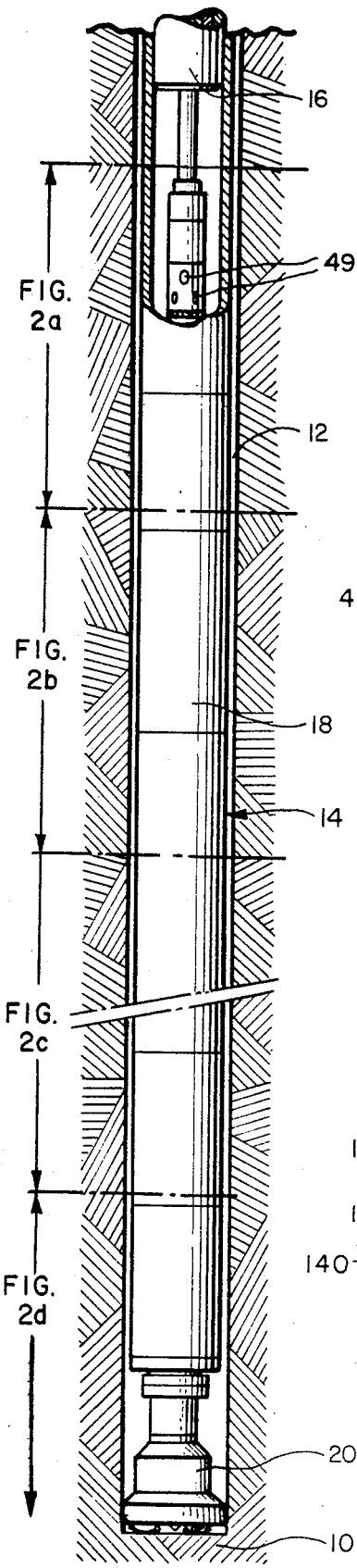
FIG. 1 is an overall elevational view of a lowermost portion of a drill string which incorporates a presently preferred embodiment of the downhole bearing assembly of this invention.

Turning now to the drawings, FIG. 1 shows a schematic view of a lowermost end of a drill string 14 which incorporates a presently preferred embodiment of the downhole bearing assembly of this invention. This drill string 14 is shown in a rock formation 10, and the drill string 14 includes a downhole motor 16, a downhole bearing assembly 18, and a bit 20. The region between the drill string 14 and the formation 10 will be referred to as the borehole annulus 12 in this specification. The downhole motor 16 can be any of a wide variety of devices known to the art, and does not form part of this invention. For example, the downhole motor 16 may be a hydraulic drilling motor of the type described in Berryman U.S. Pat. No. 3,840,080 described above. The downhole motor 16 operates to rotate the bit 20 with respect to the remainder of the drill string 14. The downhole bearing assembly 18 includes bearings which guide and allow this rotation of the bit 20.

Turning now to FIGS. 2a-2d, the downhole bearing assembly 18 is there shown in complete detail. Structurally, the downhole bearing assembly 18 comprises an inner tube 40 and an outer tube 50. In this embodiment, the inner tube 40 is mounted at its upper end 42 to the driving portion of the downhole motor 16. The inner tube 40 is mounted at its lower end 44 to the bit 20. Thus, the downhole motor 16 rotates the inner tube 40 which in turn rotates the bit 20. The inner tube 40 defines a central passageway 48 extending between the motor 16 and the bit 20. The central passageway 48 conducts drilling mud down through the center of the bearing assembly 18 to the bit 20, where the drilling mud washes chips and cuttings past the bit 20 and up the borehole annulus 12 to the surface. A lower portion of the inner tube 40 defines an array of threads 46 on an outer surface thereof. Openings 49 allow drilling mud to pass from the annulus 204 to the central passageway 48, for purposes described in detail below.

In this embodiment, the outer tube 50 is made up of six separate segments 52,54,56,58,60,62 which are interconnected by mating threads. The upper end of the first segment 52 is coupled by means of suitable threads to the nonrotating outer housing of the motor 16. Thus, the outer tube 50 rotates in unison with the drill string 14 rather than the bit 20. The outer tube 50 is made up of multiple segment in order to allow assembly of the components disposed between the outer tube 50 and the inner tube 40. As shown in FIGS. 2a-2d, the outer tube 50 is arranged concentrically around the inner tube 40 and defines an annular space therebetween.

Figure 2A:
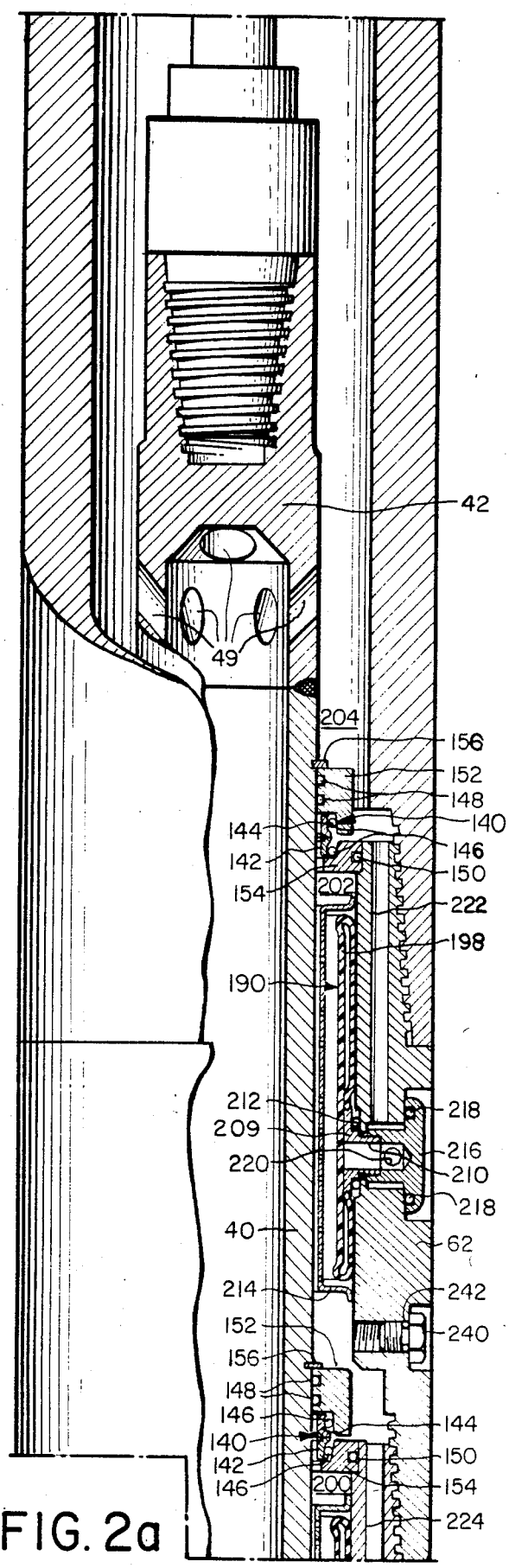
FIGS. 2a–2d are cross-sectional views of respective parts of the downhole bearing assembly of FIG. 1.

A set of radial bearings 80 and thrust bearings 100 are mounted in the annular space between the inner tube 40 and the outer tube 50 to guide rotation of the inner tube 40 and thereby of the bit 20 with respect to the outer tube 50. Each of the radial bearings 80 includes an inner race 82, an outer race 84, and a set of rollers 86 therebetween. The inner and outer races 82,84 are held in place by shoulders 90 and locking rings 88, as shown in FIG. 2c.

Figure 2B:
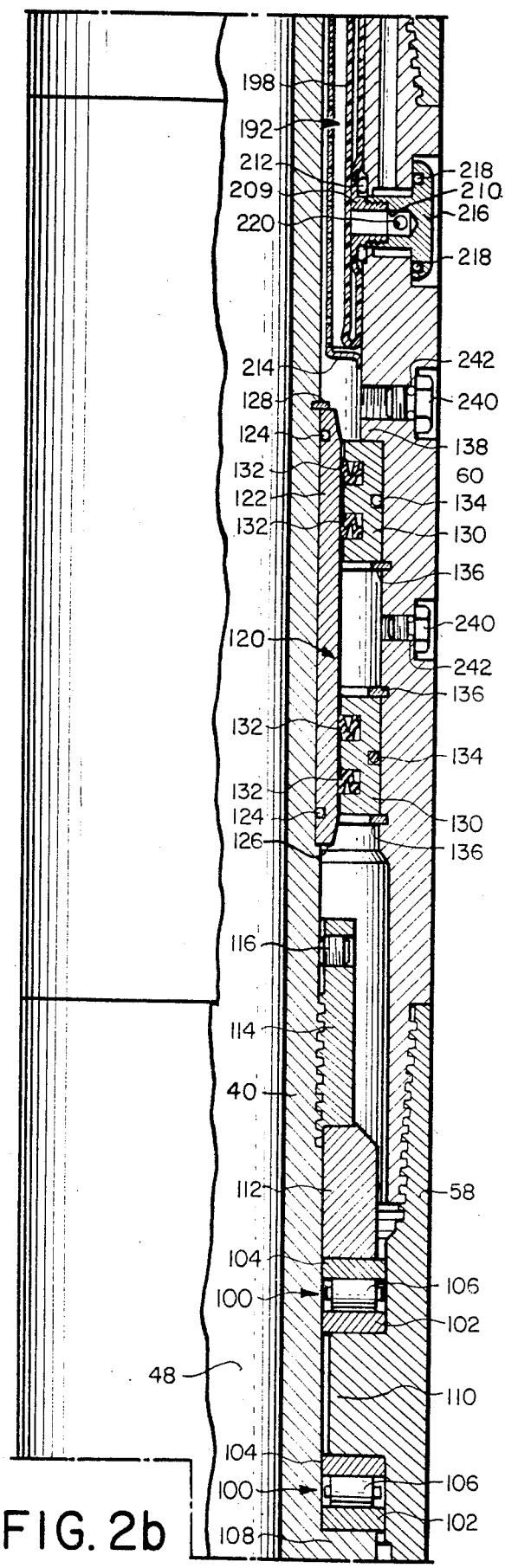
Figure 2C:
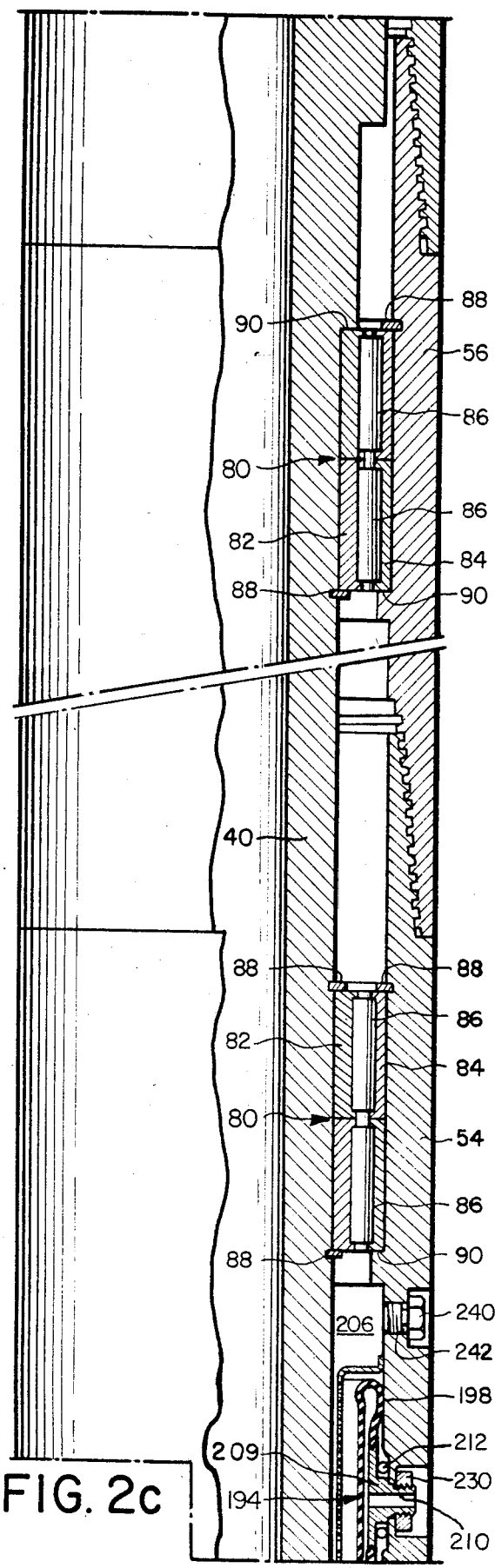

As shown in FIG. 2b, each of the thrust bearings 100 includes a lower race 102, an upper race 104, and an array of rollers 106 therebetween. The lower race 102 of the lower thrust bearing 100 bears against an inwardly facing flange 108 defined by the inner tube 40. An outwardly facing flange 110 is defined by the fourth segment 58 of the outer tube 50 and is situated between the upper race 104 of the lower thrust bearing 100 and the lower race 102 of the upper thrust bearing 100. The upper race 104 of the upper thrust bearing 100 is held in place by a collar 112 which bears against a threaded retainer sleeve 114 that is threadedly engaged with the inner tube 40. Once the threader retainer sleeve 114 has been adjusted properly to provide the desired preloading forces on the thrust bearings 100, the retainer sleeve 114 is locked in place by means of a set screw 116.

As shown in FIG. 2b, the bearing assembly 18 includes a high pressure seal assembly 120. This high pressure seal assembly 120 includes an annular seal sleeve 122 which is sealed against the inner tube 40 by means of elastomeric O-rings 124. The sleeve 122 is held in place against the inner tube 40 by means of a shoulder 126 and a locking ring 128. A pair of seal blocks 130 are provided and each of the seal blocks 130 includes recesses sized to receive outwardly facing elastomeric cup seals 132. In addition, each of the seal blocks 130 defines a recess sized to receive an elastomeric O-ring 134. The seal blocks 130 are held in place on the fifth segment 60 of the outer tube 50 by means of locking rings 136 and a shoulder 138. The O-rings 134 seal the seal blocks 130 against the fifth segment 60 of the outer tube 50, and the cup seals 132 seal the seal blocks 130 against the seal sleeve 122. The elastomeric cup seals 132 and O-rings 134 provide effective high pressure sealing across the seal blocks 130 as long as they are protected from abrasive contamination.

Figure 4:
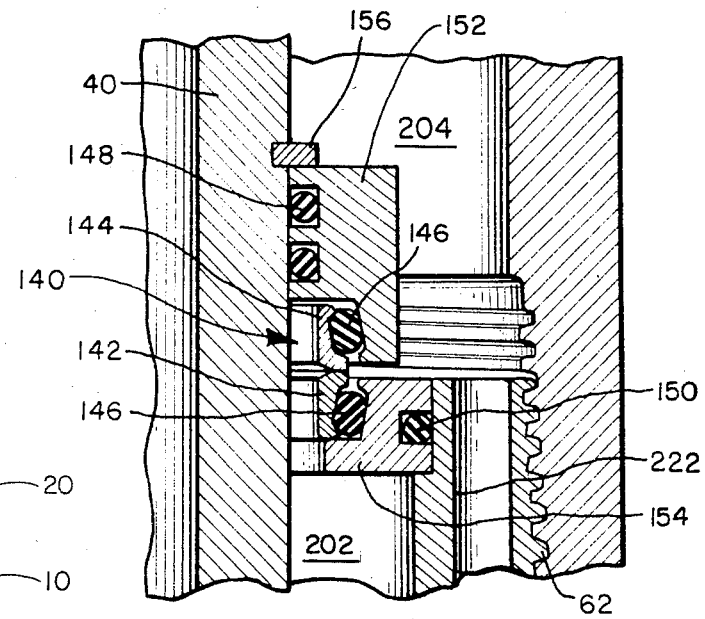
FIG. 4 is an enlarged fragmentary sectional view showing one of the metal-to-metal seals of FIG. 2a in greater detail.

As shown in FIG. 2a, a pair of abrasion-resistant, metal-to-metal seals 140 are disposed between the inner and outer tubes 40,50, above the high pressure seal assembly 120. FIG. 4 provides a more detailed view of one of these seals 140. Each of the metal-to-metal seals 140 includes a lower seal ring 142 which bears against an upper seal ring 144. The upper and lower seal rings 142,144 meet at a highly polished metal-to-metal sliding interface which allows relative rotation therebetween while providing an effective seal as long as the pressure differential across the upper and lower seal rings 142,144 does not become excessive. Upper and lower mounting rings 152,154 are mounted to the inner tube 40 and the outer tube 50, respectively. The upper mounting ring 152 is held in place by a locking ring 156 and is sealed against the inner tube 40 by elastomeric O-rings 148. The lower mounting ring 154 is in each case sealed against the respective segment of the outer tube 50 by an elastomeric O-ring 150. Elastomeric O-rings 146 are situated between the mounting rings 152,154 and the seal rings 142,144, respectively, in order to bias the seal rings 142,144 into sealing contact.

The metal-to-metal seals 140 divide the annular space between the inner tube 40 and the outer tube 50 above the high pressure seal assembly 120 effectively into three regions: the region 200 between the high pressure seal assembly 120 and the lower one of the metal-to-metal seals 140, the region 202 between the two metal-to-metal seals 140, and the region 204 above the upper one of the two metal-to-metal seals 140. As explained above, this upper region 204 is in fluid communication with the central passageway 48 by means of the openings 49.

Figure 2D:
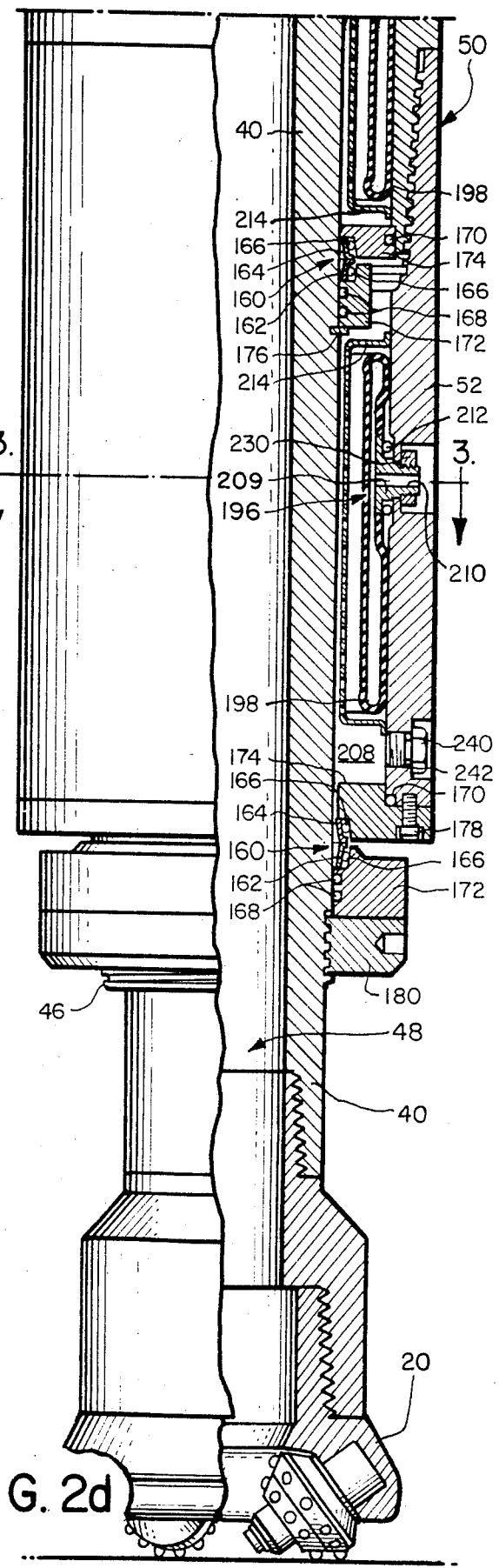

As shown in FIG. 2d, a lower pair of metal-to-metal seals 160 are provided between the inner and outer tubes 40,50 below the high pressure seal assembly 120. These lower metal-to-metal seals 160 are similar to the metal-to-metal seals 140 described above, and each includes a respective pair of seal rings 162,164, which are held in sealing engagement against one another by O-rings 166. These O-rings 166 in turn bear against mounting rings 172,174. The mounting ring 172 of the upper of the two metal-to-metal seals 160 is held in place by a locking ring 176; the mounting ring 174 of the lower one of the metal-to-metal seals 160 is held in place by bolts 170; and the mounting ring 172 of the lower one of the metal-to-metal seals 160 is held in place by a nut 180 threadedly engaged on the threads 46 defined by the inner tube 40. The O-rings 170 provide static seals between the mounting rings 174 and the respective segments 52,54 of the outer tube 50, while the O-rings 168 provide static seals between the mounting rings 172 and the inner tube 40. The metal-to-metal seals 160 function as described above in connection with the metal-to-metal seals 140. The metal-to-metal seals 160 divide the annular region between the inner and outer tubes 40,50 into a region 206 between the upper metal-to-metal seal and the seal assembly 120, and a region 208 between the two metal-to-metal seals 160.

Figure 3:
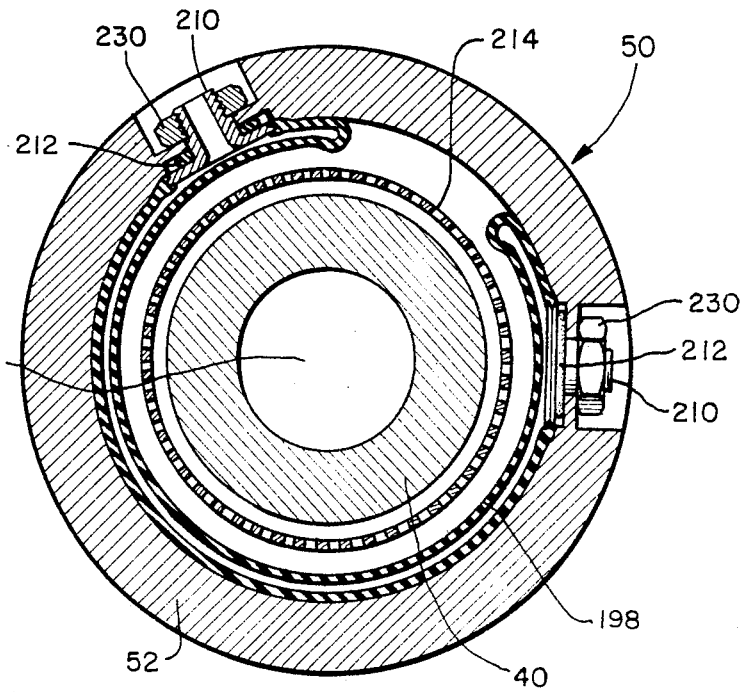
FIG. 3 is a sectional view taken along line 3—3 of FIG. 2d.

As shown in FIGS. 2a-2d, the sealed bearing assembly 18 includes four pressure balancing systems 190,192,194,196. Each of these pressure balancing systems includes a respective flexible, variable volume container 198, which will hereinafter be referred to as a "mud bag". Each of the containers 198 includes two necks 209 which define respective openings 210 as shown in FIG. 3. The necks 209 are sealed against the respective segments of the outer tube 50 by means of O-rings 212. In addition, each of the containers or mud bags 210 is loosely held in place by a bracket 214 affixed to the respective segment of the outer tube 50. The brackets 214 are perforated such that the pressure balancing systems 190,192,194,196 are in pressure communication with the chambers 202,200,206,208, respectively. The necks 209 of the pressure balancing systems 190,192 are secured to caps 216 respective threaded connections. The caps 216 are sealed against the outer tube 50 by means of O-rings 218. The caps 216 hold the mud bags 210 in position and the O-rings 212,218 in sealing engagement. Each of the caps 216 defines openings 220. The opening 220 in the upper pressure balancing system 190 is in fluid communication with the chamber 204 via the passageway 222. Similarly, the opening 220 of the lower pressure balancing system 192 is in fluid communication with the chamber 202 via the passageway 224.

As shown in FIGS. 2c-2d, the two lower pressure balancing systems 194,196 are held in place by nuts 230 which are threadedly engaged with the necks 209 which define the openings 210. Both of the openings 210 of the lower pressure balancing systems 194,196 are in fluid communication with the exterior of the outer tube 50, and therefore with the borehole annulus 12.

Filling plugs 240 are threadedly engaged in respective segments of the outer tube 50 and sealed in place by respective O-rings 242. These filling plugs 240 allow each of the regions 200,202,206,208 as well as the region between the two seal blocks 130 to be filled with a suitable lubricating oil. This lubricating oil provides important lubrication to the cup seals 132 and the bearings 80,100. In addition, this lubricating oil acts as a pressure transmitting medium in the chambers 200,202,206,208.

Only by way of example, the following details are provided to define in greater detail the presently preferred embodiment. Of course, these details are in no way intended to be limiting. Suitable metal-to-metal seals 140,160 can be obtained from Caterpillar Tractor Co. as Part Nos. 7M4B1/5P34D0 and 35303/8L5519, respectively. Suitable cup seals 130 can be obtained from Utex Industries as Part No. WQ8507. Suitable radial bearings 80 and thrust bearings 100 can be obtained from Torrington as Part Nos. HJ10412848 and 50TP119, respectively. In this preferred embodiment, the inner race of the above identified radial bearing has been replaced with one that allows an increased wall thickness of the inner tube 40. In this embodiment the mud bags 198 are formed of an oil resistant neoprene compound, with a wall thickness of one-eigth inch. The necks 209 are molded in place, and the bags are pressure tested to 30 psi. The C shape allows a single mud bag 198 to be used in a range of sizes of inner tubes 40.

Operation

The operation of the preferred embodiment shown in the drawings can now be described. In use, the inner tube 40 rotates with respect to the outer tube 50 as guided by the bearings 80,100. The high pressure seal assembly 120 creates a pressure drop thereacross substantially equal to the difference in pressure between that prevailing in the central passageway 48 and that prevailing in the borehole annulus 12. It will be recognized that this pressure differential can be either positive or negative, and that large surges in pressure are typically experienced in conjunction with the startup of mud pumps, for example.

The bearings 80,100 and the high pressure seal assembly 120 function properly when lubricated and protected from contamination with highly abrasive drilling mud. The metal-to-metal seals 140,160 and the pressure balancing systems 190-196 provide the important function of substantially preventing abrasive drilling mud from reaching the radial bearings 80, the thrust bearings 100, or the high pressure seal assembly 120.

As explained above, the metal-to-metal seals 140,160 have a suitably long life, even in the presence of abrasive drilling mud. However, these metal-to-metal seals 140,160 only seal effectively when the differential pressure thereacross is maintained at a suitably low level by the pressure balancing systems 190-196.

The uppermost one of the metal-to-metal seals 140 prevents drilling mud from passing from the region 204 to the region 202. The pressure balancing system 190 is in fluid communication via the passageway 222 with the region 204, and is in pressure communication with the region 202. Thus, pressurized drilling mud in the region 204 is transmitted via the pressure balancing system 190 to the region 202, thereby minimizing the pressure differential across the upper one of the metal-to-metal seals 140. The mud bag 198 included in the pressure balancing system 190 inflates and deflates with mud from the region 204 as necessary to equalize pressure across the upper metal-to-metal seal 140.

Similarly, the lower one of the metal-to-metal seals 140 acts as a backup, preventing abrasive drilling mud from passing from the region 202 to the region 200. The pressure balancing system 192 is in pressure communication with the region 200 and is in fluid communication via the passageway 224 with the region 202. Lubricating oil flows between the mud bag 198 of the pressure balancing system 198 and the region 202 via the passageway 224 as necessary to equalize pressure across the lower metal-to-metal seal 140. Each of the two metal-to-metal seals 140 acts as a backup for the other, and both must fail before abrasive drilling mud is permitted to reach the high pressure seal assembly 120 from the central passageway 48.

Similarly, the two metal-to-metal seals 160 operate each as a backup for the other to prevent drilling mud from reaching the region 206. Both the outer portion of the lower metal-to-metal seal 160 and the interior of the mud bag 198 included in the pressure balancing system 196 are in fluid communication with the borehole annulus 12. For this reason, the pressure balancing system 198 maintains the pressure of the region 208 at substantially that of the borehole annulus 12, thereby minimizing pressure differentials across the lower metal-to-metal seal 160. Because both of the pressure balancing systems 196,194 are in fluid communication with the borehole annulus 12, both of the regions 206,208 are maintained at substantially the pressure of the borehole annulus 12, and differential pressure across the upper of the metal-to-metal seals 160 is also minimized. Abrasive drilling mud cannot travel from the borehole annulus 12 to the region 206 unless both of the lower metal-to-metal seals 160 fail.

By way of further detail, it is preferred that the various oil chambers around the bearings 80, 100 and the seals 120,140,160 be filled with a suitable lubricating oil to ensure proper lubrication. In some applications, it may be preferable to fill all empty spaces in the interior of the mud bags 198 and related passages with a grease to exclude air. After use, the portions of the assembly exposed to drilling mud (such as the interiors of the mud bags 198) should preferably be cleaned to prevent hardening of the mud in place. The two spaced necks 209 of the mud bags 198 allow the bags 198 to be flushed clean efficiently.

From the foregoing description it should be apparent that the above-described downhole bearing assembly combines the abrasion-resistant characteristics of metal-to-metal seals with the high pressure characteristics of elastomeric seals by providing suitable pressure balancing systems to ensure that pressure differentials across the metal-to-metal seals are maintained within appropriate limits. In this way, a remarkably effective, reliable, and readily manufactured system is provided which can be used to obtain excellent bearing life in a downhole environment.

Of course, it should be understood that a wide range of change and modifications can be made to the preferred embodiment described above. For example, in some downhole drilling situations it is the outer tube of the drilling motor which rotates with respect to the inner tube. The present invention can readily be adapted for use with such drilling motors. Furthermore, it is not necessary in all applications that four separate metal-to-metal seals and four separate pressure balancing systems be provided. In some applications it may be preferable to provide only a single pair of metal-to-metal seals and pressure balancing systems, one on either side of the high pressure seals. In fact, in applications where the bearings and high pressure seal need only be protected from abrasive materials on one side, only a single pressure balancing system and metal-to-metal seal need be provided. Finally, the present invention is not restricted for use with downhole drilling motors of the type described above, but rather can be applied widely to downhole bearing assemblies which must be operated in highly abrasive environments.

It is therefore intended that the foregoing detailed description be regarded as illustrative rather than limiting, and that it be understood that it is the following claims, including all equivalents, which are intended to define the scope of this invention.

I claim:
1. A sealed downhole bearing assembly comprising:
   an outer tube adapted to be connected to a first portion of a drill string;
   an inner tube adapted to be connected to a second portion of a drill string and disposed within the outer tube to define an enclosed annular space therebetween;
   at least one bearing mounted in the annular space between the outer and inner tubes to allow relative rotation therebetween;
   at least one high pressure seal mounted in the annular space between the outer and inner tubes to divide the annular space into first and second chambers;
   first and second abrasion resistant, metal-to-metal seals mounted between the inner and outer tubes to seal the first and second chambers, respectively, said first seal in fluid communication with an outer region exterior of the outer tube and said second seal in fluid communication with an inner region interior of the inner tube, said metal-to-metal seals adapted to seal effectively when in contact with drilling mud;
   first and second pressure balancing systems in communication with the first and second chambers, respectively, said first pressure balancing system also in communication with the outer region to balance pressure in the first chamber with respect to the outer region, said second pressure balancing system also in communication with the inner region to balance pressure in the second chamber with respect to the inner region;
   each of said pressure balancing systems comprising respective flexible, variable volume containers.

2. The invention of claim 1 wherein the at least one bearing comprises both at least one radial bearing and at least one thrust bearing.

3. The invention of claim 1 wherein the at least one high pressure seal comprises a pair of opposed cup seals.

4. The invention of claim 1 wherein each of the containers comprises a respective mud bag.

5. A sealed downhole bearing assembly comprising:
   an outer tube adapted to be connected to a first portion of a drill string;
   an inner tube adapted to be connected to a second portion of a drill string and disposed within the outer tube to define an enclosed annular space therebetween;
   at least one bearing mounted in the annular space between the outer and inner tubes to allow relative rotation therebetween;
   at least one high pressure seal mounted in the annular space between the outer and inner tubes to divide the annular space into first and second chambers;
   first and second abrasion resistant, metal-to-metal seals mounted between the inner and outer tubes to seal the first and second chambers, respectively, said first seal in fluid communication with an outer region exterior of the outer tube and said second seal in fluid communication with an inner region interior of the inner tube, said metal-to-metal seals adapted to seal effectively when in contact with drilling mud;
   first and second pressure balancing systems in communication with the first and second chambers, respectively, said first pressure balancing system also in communication with the outer region to balance pressure in the first chamber with respect to the outer region, said second pressure balancing system also in communication with the inner region to balance pressure in the second chamber with respect to the inner region;
   a third pressure balancing system in communication with both the first chamber and the outer region to balance pressure in the first chamber with respect to the outer region; and
   a third abrasion resistant, metal-to-metal seal mounted between the inner and outer tubes within the first chamber between the first and third pressure balancing systems such that contamination from the outer region must pass both the first and third metal-to-metal seals to reach the high pressure seal.

6. The invention of claim 5 further comprising:
a fourth pressure balancing system in communication wtih both the second chamber and the inner region to balance pressure in the second chamber with respect to the inner region; and
a fourth abrasion resistant, metal-to-metal seal mounted between the inner and outer tubes within the second chamber between the second and fourth pressure balancing systems such that contamination from the inner region must pass both the second and fourth metal-to-metal seals to reach the high pressure seal.

7. In combination with a drill string of the type comprising a drill bit and a downhole motor adapted to rotate the drill bit to form a borehole and comprising a driven member and a reaction member, the improvement comprising:
an inner tube;
an outer tube;
a first one of the inner and outer tubes connected between the driven member of the downhole motor and the bit to rotate the bit;
a second one of the inner and outer tubes connected to the reaction member;
said inner tube disposed concentrically within the outer tube to form an enclosed annular space therebetween;
said inner tube defining a central passageway operating to conduct drilling mud to the bit under pressure;
said outer tube in communication with the borehole;
at least one bearing mounted in the annular space between the inner and outer tubes to guide rotation of the
first one of the inner and outer tubes with respect to the second one of the inner and outer tubes;
a first abrasion resistant, metal-to-metal seal mounted between the inner and outer tubes to seal the annular space with respect to the central passageway on a first side of the bearing and to protect the bearing from contamination with drilling mud from the central passageway;
a second abrasion resistant, metal-to-metal seal mounted between the inner and outer tubes to seal the annular space with respect to the borehole on a second side of the bearing and to protect the bearing from contamination with drilling mud from the borehole;
a pressure resistant seal mounted between the inner and outer tubes in the annular space between the first and second metal-to-metal seals to divide the annular space into first and second pressure chambers;
a first pressure balancing system mounted in the first pressure chamber to balance pressure within the first pressure chamber with respect to pressure in the central passageway in order to reduce differential pressure across the first metal-to-metal seal;
a second pressure balancing system mounted in the second pressure chamber to balance pressure within the second pressure chamber with respect to pressure in the borehole in order to reduce differential pressure across the second metal-to-metal seal;
said pressure resistant seal adapted to resist a pressure differential between the central passageway and the borehole during operation of the downhole motor;
a third pressure balancing system mounted in the first pressure chamber to balance pressure within the first pressure chamber with respect to pressure in the central passageway; and
a third abrasion resistant, metal-to-metal seal mounted between the inner and outer tubes between the first and third pressure balancing systems.

8. The invention of claim 7 further comprising:
a fourth pressure balancing system mounted in the second pressure chamber to balance pressure within the second pressure chamber with respect to pressure in the borehole; and
a fourth abrasion resistant, metal-to-metal seal mounted between the inner and outer tubes between the second and fourth pressure balancing systems.

9. In combination with a drill string of the type comprising a drill bit and a downhole motor adapted to rotate the drill bit to form a borehole and comprising a driven member and a reaction member, the improvement comprising:
an inner tube;
an outer tube;
a first one of the inner and outer tubes connected between the driven member of the downhole motor and the bit to rotate the bit;
a second one of the inner and outer tubes connected to the reaction member;
said inner tube disposed concentrically within the outer tube to form an enclosed annular space therebetween;
said inner tube defining a central passageway operating to conduct drilling mud to the bit under pressure;
said outer tube in communication with the borehole;
at least one bearing mounted in the annular space between the inner and outer tubes to guide rotation of the first one of the inner and outer tubes with respect to the second one of the inner and outer tubes;
a first abrasion resistant, metal-to-metal seal mounted between the inner and outer tubes to seal the annular space with respect to the central passageway on a first side of the bearing and to protect the bearing from contamination with drilling mud from the central passageway;
a second abrasion resistant, metal-to-metal seal mounted between the inner and outer tubes to seal the annular space with respect to the borehole on a second side of the bearing and to protect the bearing from contamination with drilling mud from the borehole;
a pressure resistant seal mounted between the inner and outer tubes in the annular space between the first and second metal-to-metal seals to divide the annular space into first and second pressure chambers;
a first pressure balancing system mounted in the first pressure chamber to balance pressure within the first pressure chamber with respect to pressure in the central passageway in order to reduce differential pressure across the first metal-to-metal seal;

a second pressure balancing system mounted in the second pressure chamber to balance pressure within the second pressure chamber with respect to pressure in the borehole in order to reduce differential pressure across the second metal-to-metal seal;

said pressure resistant seal adapted to resist a pressure differential between the central passageway and the borehole during operation of the downhole motor;

each of the pressure balancing systems comprising a respective variable volume mud bag.

10. The invention of claim 9 wherein the pressure resistant seal comprises a pair of opposed cup seals.

* * * * *